Aug. 26, 1930.  J. F. PETERS  1,773,856
MACHINE FOR FORMING METAL BANDS
Filed Jan. 10, 1929   10 Sheets-Sheet 1

INVENTOR
John F. Peters
BY John C. Carpenter
ATTORNEY

Aug. 26, 1930. J. F. PETERS 1,773,856
MACHINE FOR FORMING METAL BANDS
Filed Jan. 10, 1929 10 Sheets-Sheet 3

INVENTOR
John F. Peters
BY John C. Carpenter
ATTORNEY

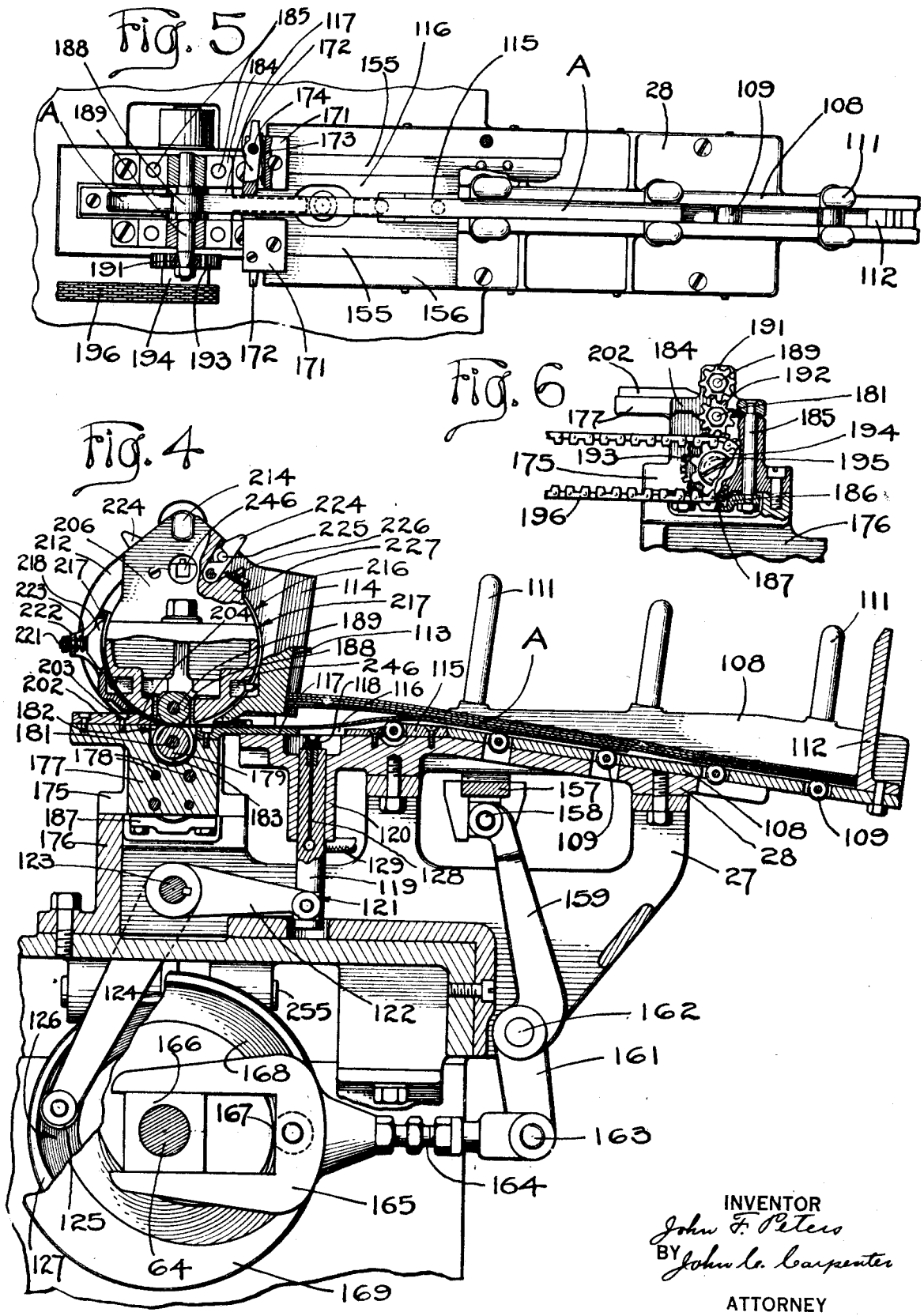

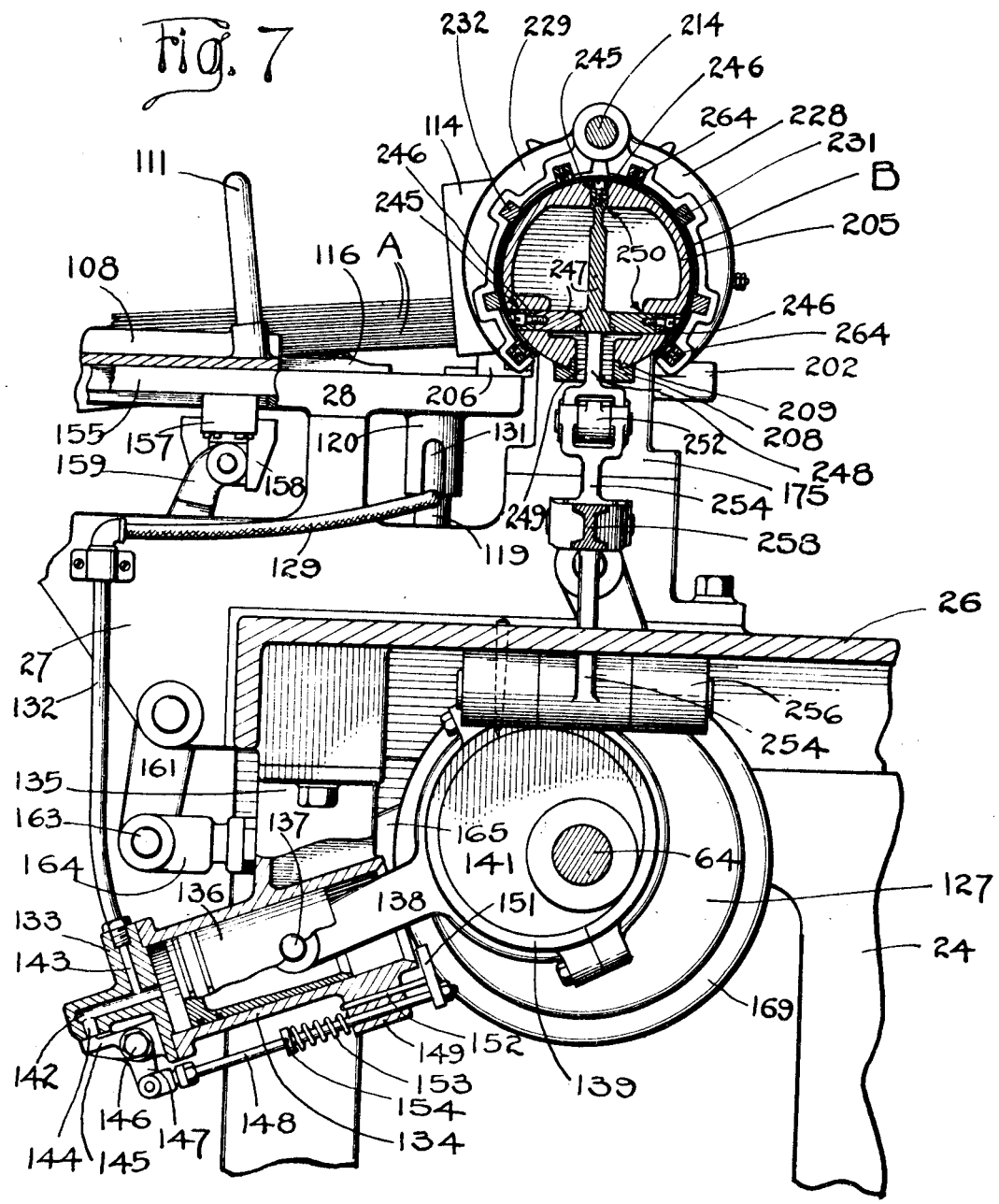

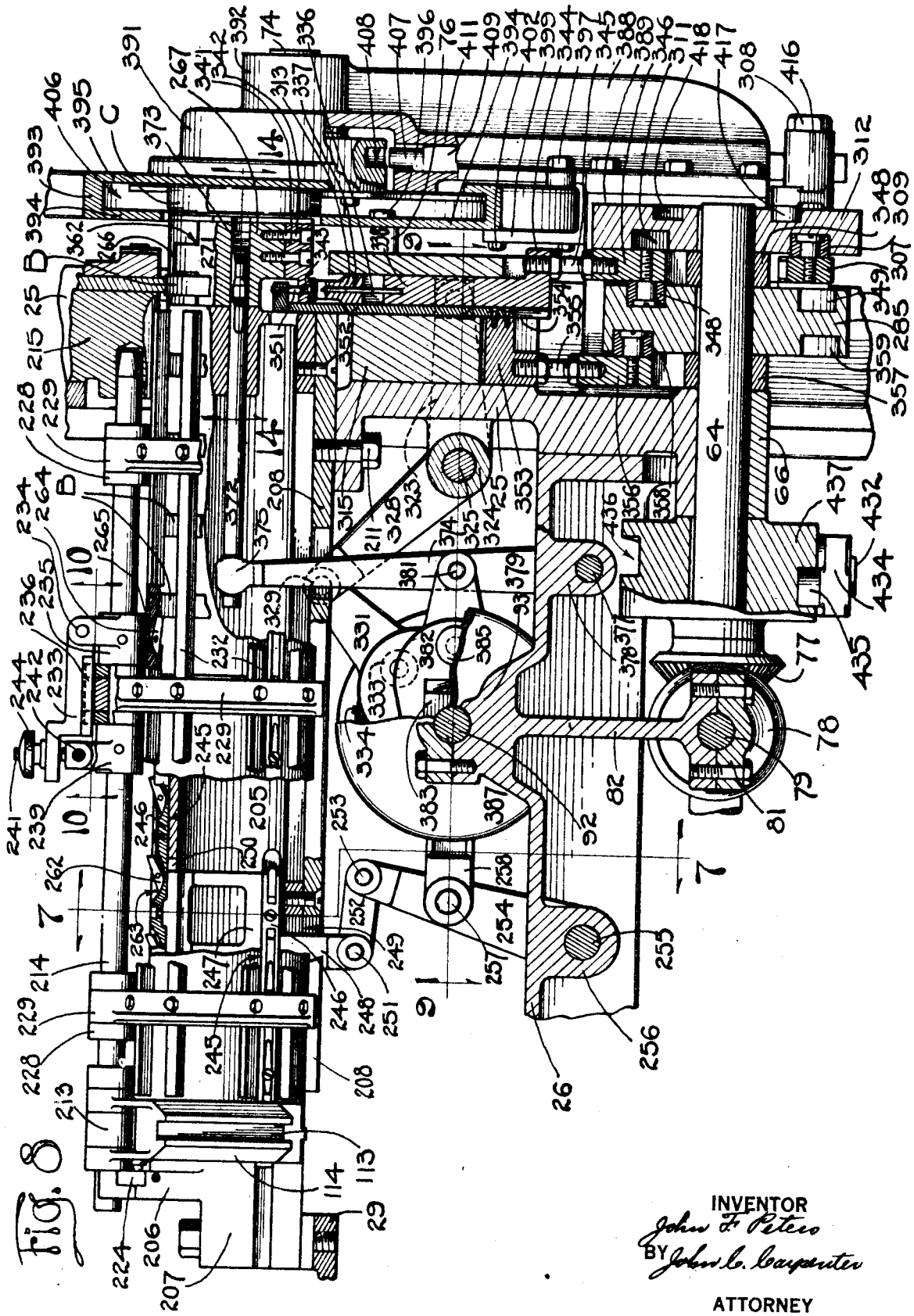

Aug. 26, 1930.  J. F. PETERS  1,773,856
MACHINE FOR FORMING METAL BANDS
Filed Jan. 10, 1929  10 Sheets-Sheet 7

INVENTOR
John F. Peters
BY John C. Carpenter
ATTORNEY

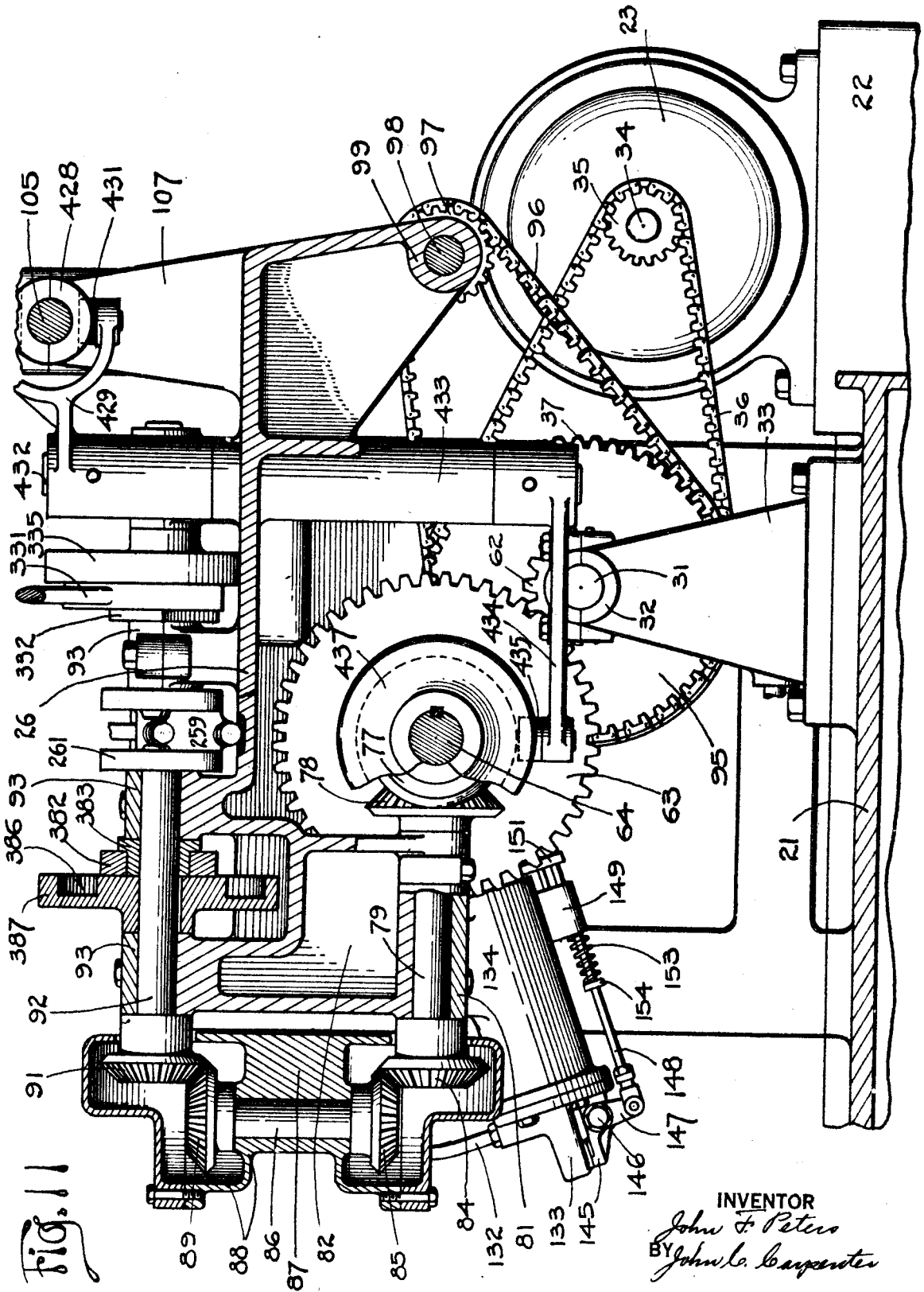

Aug. 26, 1930.  J. F. PETERS  1,773,856
MACHINE FOR FORMING METAL BANDS
Filed Jan. 10, 1929  10 Sheets-Sheet 9
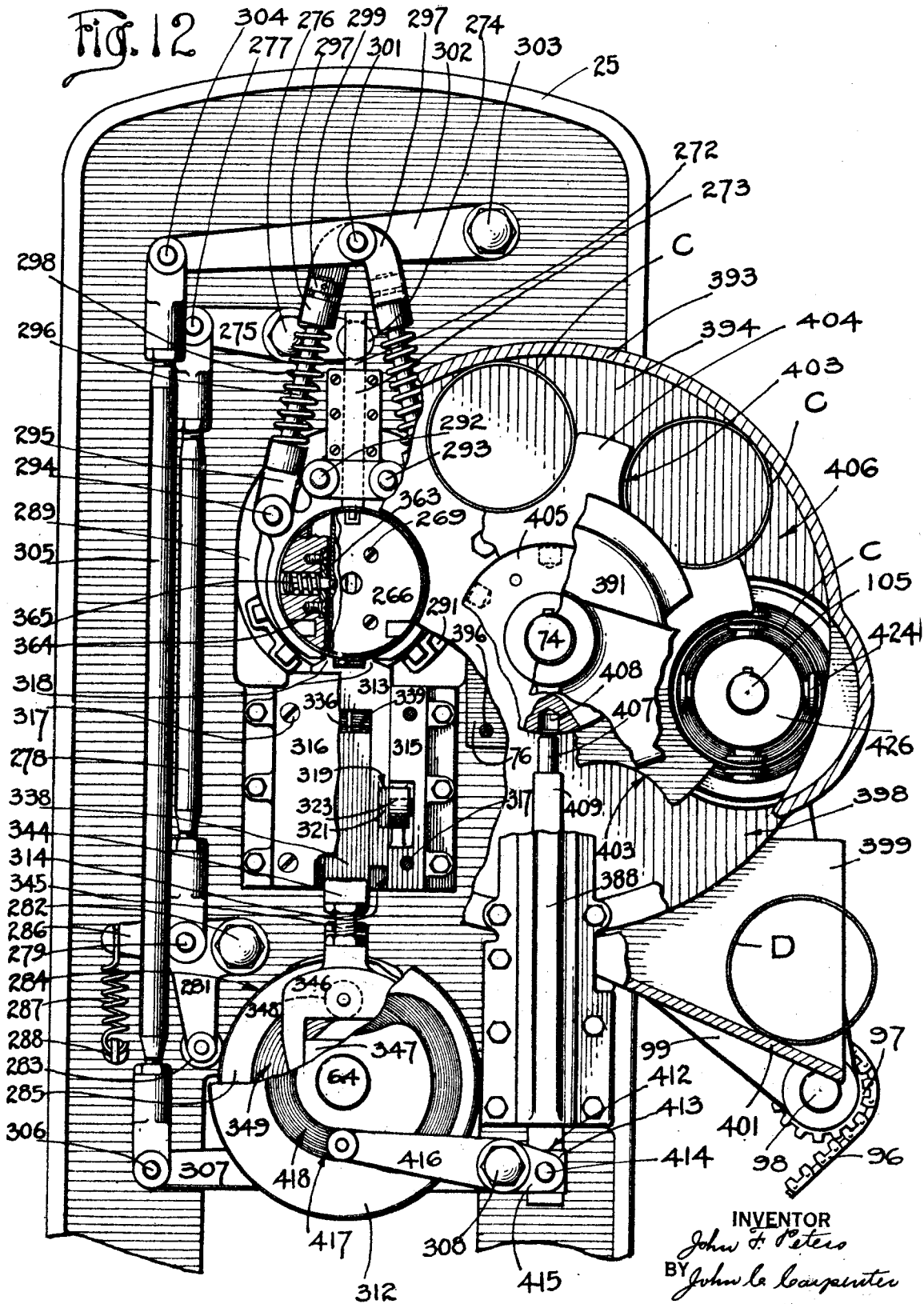
INVENTOR
John F. Peters
BY John C. Carpenter
ATTORNEY

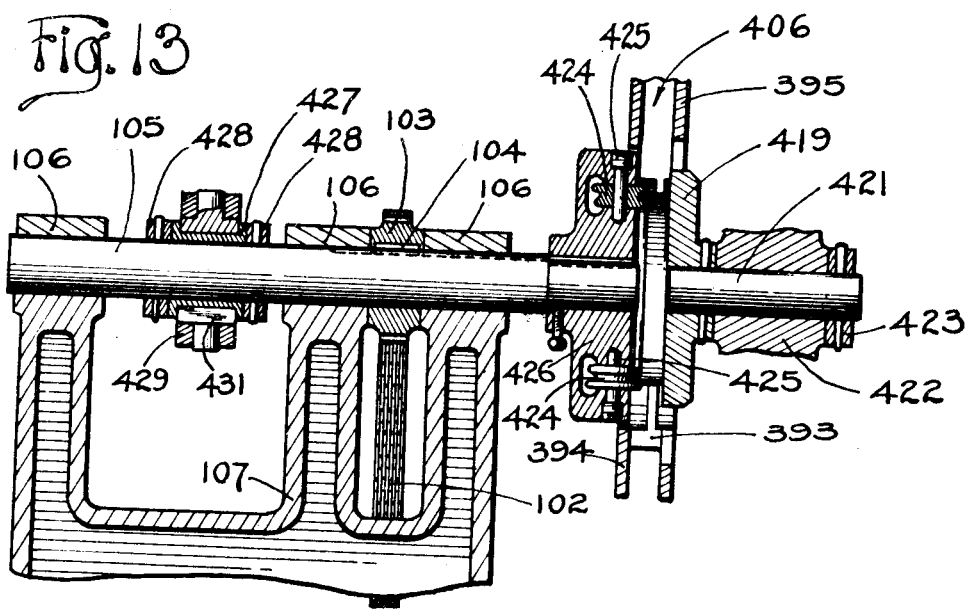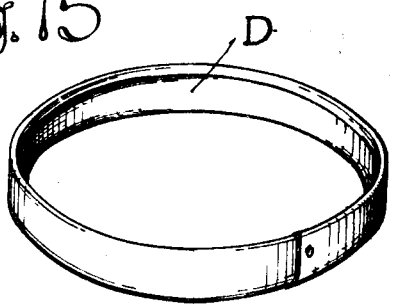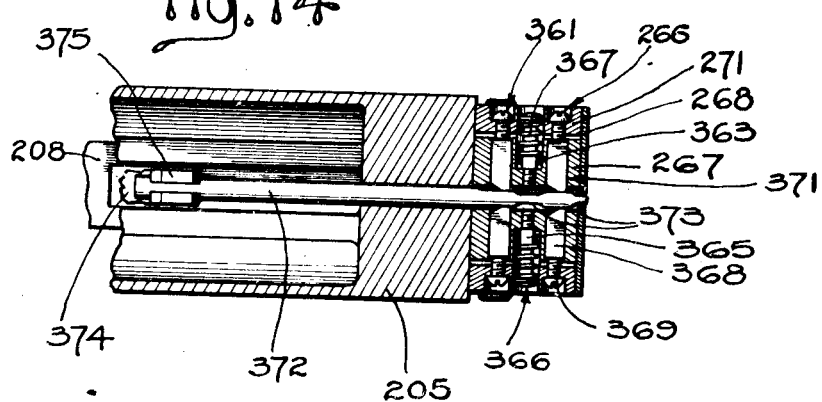

Patented Aug. 26, 1930

1,773,856

UNITED STATES PATENT OFFICE

JOHN F. PETERS, OF ROCHESTER, NEW YORK, ASSIGNOR TO AMERICAN CAN COMPANY, OF NEW YORK, N. Y., A CORPORATION OF NEW JERSEY

MACHINE FOR FORMING METAL BANDS

Application filed January 10, 1929. Serial No. 331,664.

This invention relates to machines for forming metal bands, particularly of that type which are adapted for insertion into the body of a can to form an interior collar upon which a severed upper portion of the body may be positioned as a temporary closure after being separated by removal of a tearing strip, or in other manner.

A principal object of the invention is the provision of an efficient organized machine for forming a collar band from a strip and flanging and curling the edge thereof in which the various operating parts are so related and actuated as to render possible a very high rate of production.

Another and very important object is the provision in a machine of this character of automatically acting devices for feeding metal strips of cut material from a stack or magazine of strips and for forming the same to produce a continuous and properly sized collar band for the purpose specified.

Still another object is the provision of means operating upon the formed, continuous and properly sized collar band during its normal course through the machine for curling an edge thereof to produce a continuous curled collar band.

Numerous other objects and advantages of the invention will be apparent as it is better understood from the following description, which, taken in connection with the accompanying drawings, discloses a preferred embodiment thereof.

Referring to the drawings:

Fig. 4 is an enlarged, cross-sectional view taken on a plane passing through the center of the strip magazine and feeding mechanism, being taken substantially along line 4—4 of Fig. 1;

Fig. 5 is an enlarged plan view of parts illustrated in Fig. 4;

Fig. 6 is an enlarged fragmentary elevational detail of the end of the forming roller shafts, parts being broken away;

Fig. 7 is an enlarged cross-sectional view taken through the apparatus substantially along lines 7—7 of Figs. 1 and 8;

Fig. 8 is an enlarged longitudinal sectional view taken substantially along line 8—8 of Fig. 1;

Fig. 11 is an enlarged transverse sectional view taken substantially along line 11—11 of Fig. 1;

Fig. 12 is an enlarged end elevation, with parts broken away and parts illustrated in section, the view being taken from the forward or discharge end of the machine;

Fig. 13 is an enlarged longitudinal sectional detail taken substantially along line 13—13 of Fig. 1;

Fig. 14 is an enlarged cross-sectional detail taken substantially along line 14—14 of Fig. 8;

Fig. 15 is a perspective view of a completed collar band such as is formed and curled in a machine of the present invention;

Figs. 16, 17 and 18 are enlarged fragmentary details in cross section of the collar band in its different stages of formation.

Figure 1:
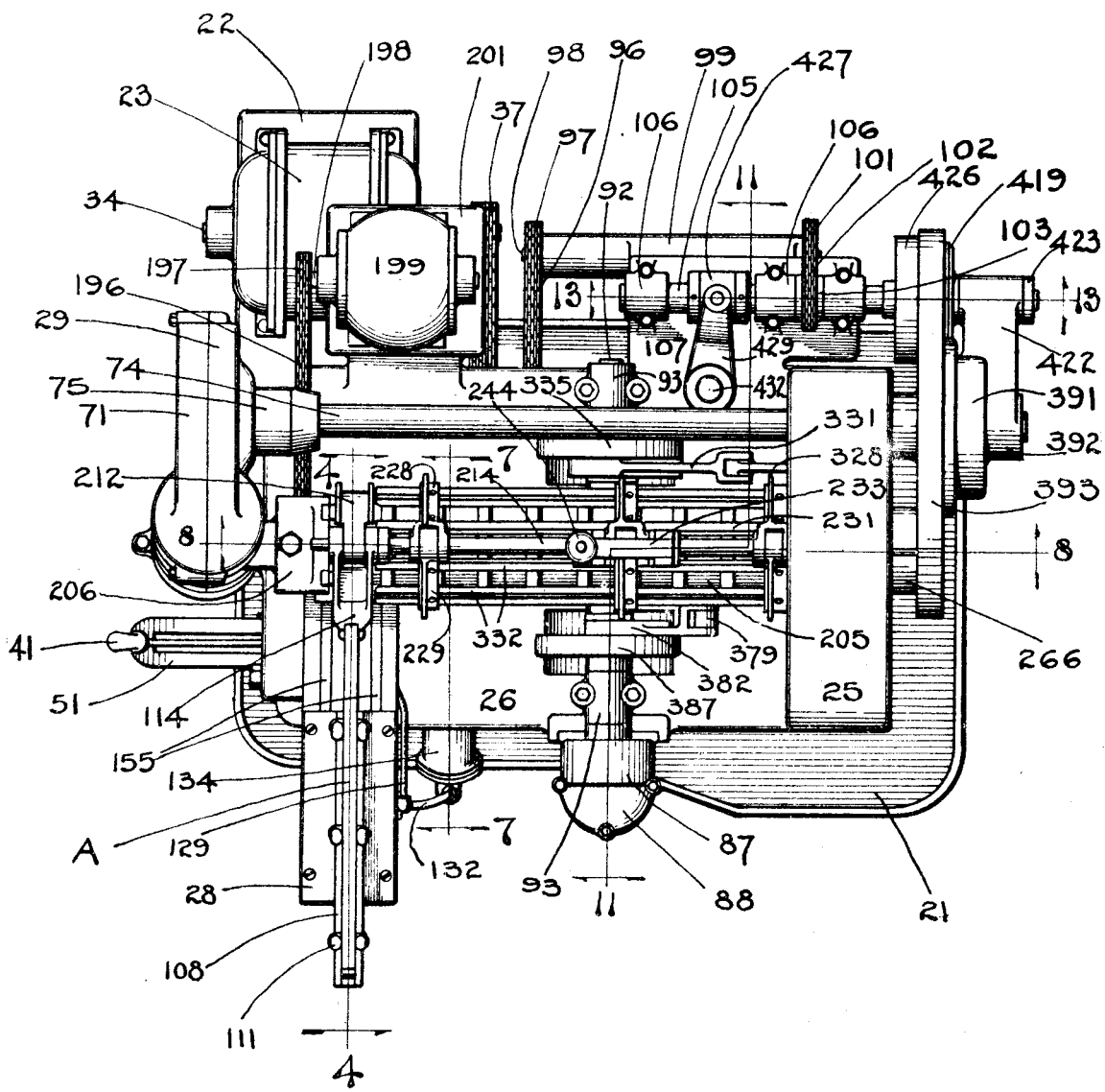
Figure 1 is a plan view of the collar band forming and curling machine.

The principal working parts of the machine disclosed in the drawings are mounted on a suitable frame and are operated in proper timed relation, one with another, by connection with a drive shaft, which is illustrated as receiving rotation by direct connection with an electric motor. Forming rollers of the apparatus are driven at a much higher speed than the other operating parts of the machine, and these receive their rotation by direct connection with a second electric motor.

Strips of sheet metal, which have been properly cut to size, are held in a magazine mounted within the machine and each strip is removed individually from the bottom part of the stack of strips within the magazine and is automatically fed into the forming rollers. These rollers, in cooperation with a deflecting plate, bend the strip into circular form at the same time slightly flanging or bending both edges of the strip to produce a cross section, such as is shown in Fig. 16.

The formed strip or incomplete band, after passing through the forming rollers, is positioned over a horizontal forming mandrel which is of circular shape except for a supporting structure at the bottom part of the same which extends throughout a greater part of its length. During this movement into position upon the mandrel, the band passes adjacent a curved retaining plate and a retaining block. At this stage of development of the formed strip or incompleted band, the same rests with the central part at the top of the mandrel and its free ends are separated by the supporting structure at the bottom. The incompleted band is then moved along the mandrel longitudinally, this being at right angles to the direction of travel of the strip through the forming rollers.

This movement along the mandrel is accomplished by means of reciprocating feed bars carrying spring-pressed dogs which engage the band and advance it in a step by step movement along the mandrel. The band, during this movement, is held against accidental displacement by semi-circular wings carrying guide bars which extend longitudinally of the mandrel and are spaced a sufficient distance therefrom to form a pass for the band. As the strip is brought to rest at various positions along the mandrel, the reciprocating feed bars are retracted to engage succeeding, newly placed strips or bands.

There are a number of idle stations or rest positions, this being necessary in order to provide sufficient space for the actuating parts of the machine. The band is finally brought to position on an auxiliary horn or mandrel extension attached to the end of the forming mandrel, the auxiliary horn being continuously cylindrical and of reduced diameter. The band is brought to rest in position on the auxiliary horn where the same is first clamped at the top, then on the sides, and immediately following the ends thereof are overlapped on the under side of the auxiliary horn, after which they also are clamped. While held in this position, the mechanism operates to punch a hole through the two overlapped ends of the band and while still held other mechanism operates to rivet the projecting metal struck out in the punching operation. The final riveted ends are illustrated in Fig. 17.

The completely riveted band is then moved from the auxiliary horn (the latter being momentarily contracted or collapsed) and positioned into a pocket of an intermittently movable turret which transfers the same to a curling station. At this station, the collar is clamped between a backing plate and a rotating curling head and one edge of the same is curled, as shown in Fig. 18. If it is desirable to curl both edges of the collar, a second curling head similar in construction to the first is substituted for the backing plate.

As an aid to a better understanding of the mechanism, the description to follow will be roughly classified according to the operations performed at the various operating stations. Such a classification is necessarily more or less arbitrary and merely seeks to group mechanisms which are most closely associated. In such a classification, there is no exact line of demarkation between the different classes and it will be necessary quite frequently for different sets of mechanisms to overlap more or less.

*Supporting frame structure*

Figure 2:
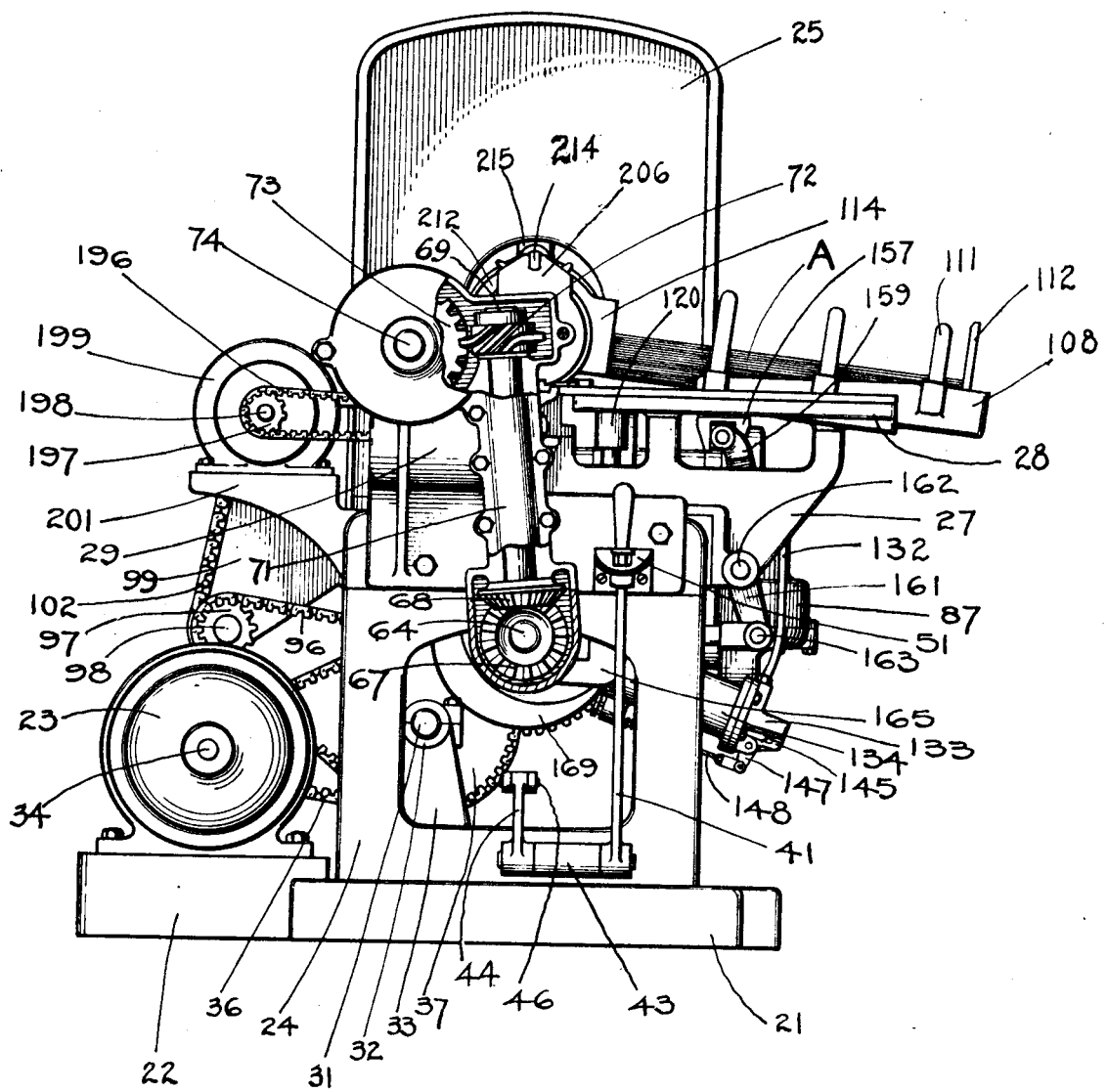
Fig. 2 is an end elevation of the machine viewed from the feed or rear end, parts of the gear housing being broken away to illustrate details of construction.
Figure 3:
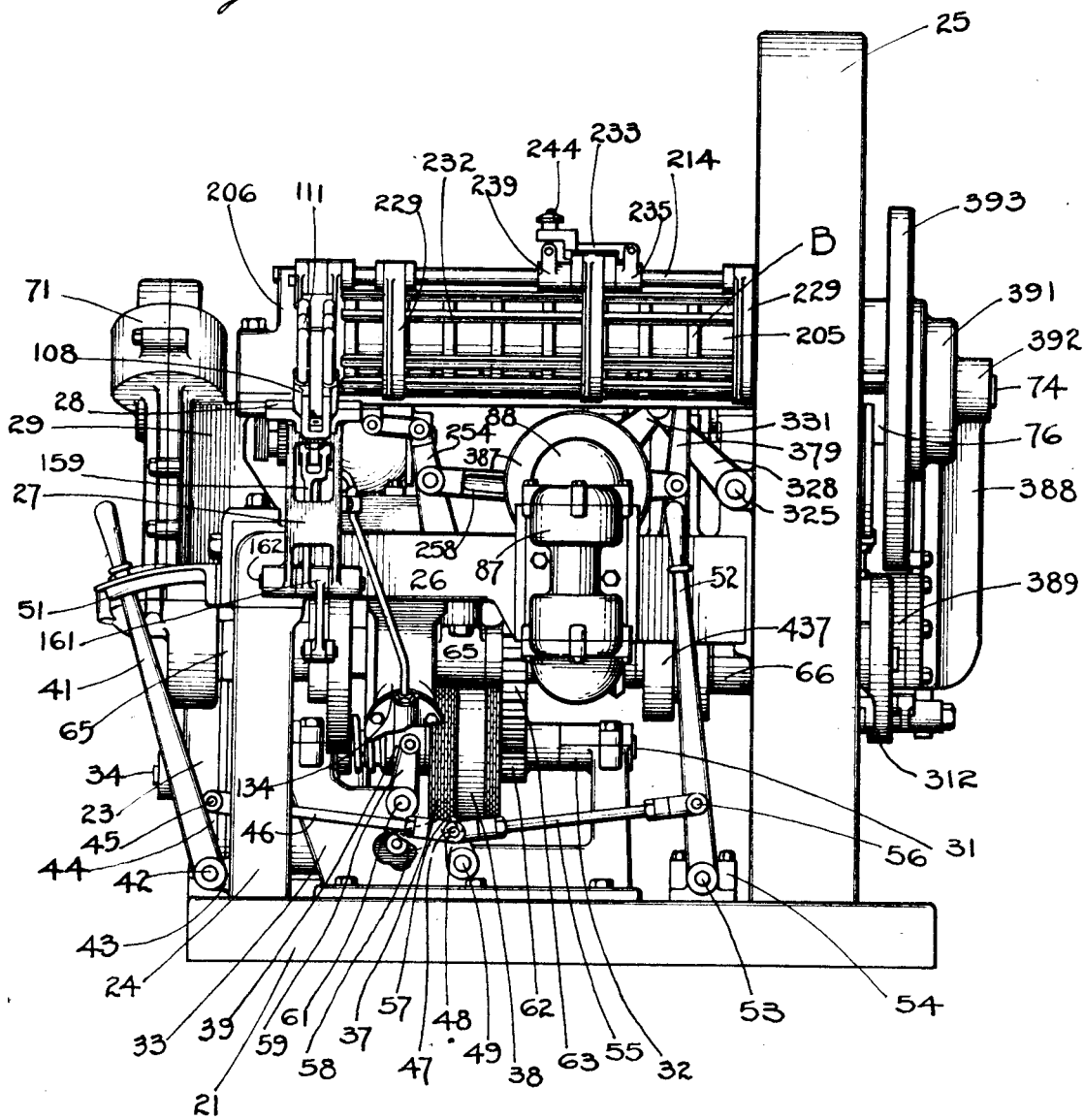
Fig. 3 is a side elevation of the machine.

As illustrated in Figs. 1, 2 and 3, the operating and supporting parts of the machine are carried on a base 21, a secondary or auxiliary motor base 22 being mounted adjacent the former and supporting the principal driving element, illustrated as an electric motor 23. A supporting leg 24, carried by the base 21, cooperates with an upwardly extending arch frame 25 to support a bed or table 26, frame 25 also resting on the base. The principal driving mechanism is mounted beneath the table 26, and the devices for performing the various operations to create the collar band are for the most part mounted above the table. A bracket or intermediate frame 27 is supported by table 26 at the rear end of the machine and this carries a strip magazine supporting frame 28 on which the strip magazine and feed mechanism are mounted. A turret drive casing bracket 29 is secured to and carried by the table 26 and supports a part of the driving mechanism relating to the turret shaft and associated parts. A clutch or drive shaft 31 is journalled in bearings 32 of a main drive frame 33 mounted on the base 21. Other brackets, supports, shafts, etc. will hereinafter be referred to in connection with the description of the various operating parts.

*Driving mechanism and handle controls*

Reference should now be had to Figs. 1, 2, 3 and 11, which illustrate the principal driving mechanism connected to the various operating shafts. A motor shaft 34 of the motor 23 carries a sprocket 35 over which operates a chain drive 36 passing at its opposite end of travel over a sprocket 37. Said sprocket is formed as a part of a driving drum 38 (Fig. 3) which idly rotates on the clutch shaft 31 when the driving parts are not in clutched or active position. A disk or other suitable form of clutch mechanism, referred to generally by the numeral 39, is interposed between the drum 38 and the clutch shaft 31 and upon clutching operation connects the latter with the motor-driven drum 38.

The actuating control, by which the clutch 39 is caused to connect the clutch shaft 31 with the driving parts of the machine, comprises dual actuating handle members located at different positions. While the two handle members operate in unison, actuation of either will throw the clutch mechanism into or out of clutched position.

One control member comprises a hand lever 41 secured to a rock shaft 42 journalled for oscillation in a bracket 43 projected from the supporting leg 24. The opposite end of the rock shaft 42 carries an arm 44 on which is pivotally mounted, as at 45, a connecting rod 46 which in turn is pivoted at 47 to an arm 48 secured to a second rock shaft 49 oscillating in bearings formed in the drive frame 33. A slotted bracket 51, extending from the bracket 29, forms limiting stops for the two positions of the hand lever, the upper end of the same moving in the slot of said bracket.

The second control member comprises a hand lever 52, which is secured to a rock shaft 53 moving in a bracket 54 carried by the base 21. A connecting rod 55 is pivotally attached at 56 to the lever 52 and the opposite end is connected to the pivot pin 47 of the arm 48. Thus movement of either of the levers 41 or 52 moves the rock shaft 49. An arm 57 is also carried by the rock shaft 49 and is connected by means of a link 58 with the lower arm of a yoke 59 pivoted at 61 to the drive frame 33. The upper arms of yoke 59 are pivotally connected with sliding parts of the clutch mechanism 39 and oscillation of the yoke about its pivot 61 connects or disconnects the clutch members to engage or disengage the clutch shaft 31 and the driving drum 38.

Clutch shaft 31 (Figs. 3, 8 and 11) carries a pinion 62 which meshes with a gear 63 secured to a horizontal cam shaft 64 journalled in bearings 65 carried by the table 26 and in a bearing 66 carried by the arch frame 25. Shaft 64 carries operating members for actuating the strip feeding, clamping, riveting and horn collapsing mechanism which will be fully described in connection with the operation of those parts.

As illustrated in Fig. 2, one extremity of the cam shaft 64 carries a bevel gear 67 which meshes with a similar gear 68 mounted on the lower end of a substantially vertical shaft 69 rotating in the bracket 29 and in a housing 71 secured thereto. The upper end of shaft 69 carries a mutilated spiral gear 72 which meshes with a companion gear 73 secured to a horizontal turret shaft 74 journalled at its rear end in a bracket 75 formed in bracket 29 and journalled at its forward end in a plate 76 secured to arch frame 25 (see Fig. 12). Said turret shaft 74 accomplishes the intermittent operation of the turret and will be described in further detail hereinafter.

As illustrated in Figs. 8 and 11, the cam shaft 64 also carries a bevel gear 77 which meshes with a similar gear 78 carried on one end of a horizontal stub shaft 79 journalled in a bearing 81 formed in a bracket 82 extending down from the table 26. Shaft 79 also carries a bevel gear 84 which meshes with a corresponding gear 85 secured to the lower end of a vertical shaft 86 journalled for rotation in a bearing 87 carried by a gear housing 88 secured to one side of the table 26. The upper end of the vertical shaft 86 carries a bevel gear 89 which meshes with a corresponding gear 91 carried on one extremity of an auxiliary cam shaft 92 journalled in bearings 93 formed upon and carried by the table 26 (see also Fig. 9). The shaft 92 forms the actuating drive for the feed bar operation and other operations which will be described in detail under the proper classification.

As illustrated in Fig. 11, the clutch shaft 31 also carries a sprocket 95 over which operates a drive chain 96 which passes at its opposite line of travel over a sprocket 97 carried by a horizontal curling head drive shaft 98 journalled in a bracket 99 formed in the table 26. Drive shaft 98 (Fig. 1) also carries a sprocket 101 over which operates a chain 102 passing at its upper line of travel over a sprocket 103 slidingly mounted with a feather 104 (Fig. 13) on a curling head shaft 105. Said shaft 105 both rotates and slides relative to bearings 106 carried in a bracket 107 mounted on table 26 and this mechanism forms the driving connection for the curling devices described hereinafter.

*Strip magazine and feed*

In the present description the metal strips from which the collar bands are formed by the apparatus will be designated by the letter "A". After these are formed into annular shape, the incomplete band with disconnected ends will be referred to by the letter "B". Letter "C" will designate the complete annulus, this being the band with its ends punched and riveted together. The final curled and completely formed collar band will be referred to by the letter "D".

Strips "A" are stacked one above the other and placed in a magazine associated with the apparatus of the present invention which, as illustrated in Figs. 4 and 5, includes a magazine holder 108 mounted on the magazine frame 28. A series of anti-frictional rollers 109 carried by the bottom of the holder 108 and projecting through openings formed therein constitute a support for the stack of strips "A". Pegs 111 project from the upper surface of the holder 108 and form extended side walls for the stack of strips and a plate 112 secured to the bottom of the holder constitutes a rear wall for the strips. The forward end of the stack of strips rests within a vertical groove 113 formed in a retaining block 114 secured to parts of a frame associated with a forming mandrel as hereinafter described in another section of this description. The forward end of holder 108 terminates at a distatnce from block 114 and a surface plate 115 is positioned on frame 28 directly beneath the forward ends of strips "A", this plate forming an extension of the bottom of the holder. Two spaced plates 116 are mounted on frame 28 adjacent the plate 115 and these extend forwardly to a position beneath block 114. Surface plate 117 mounted on frame 28 extends for a slight distance between the forward ends of plates 116. Plates 115 and 117 form a smooth surface over which the strips "A" pass as they are withdrawn one at a time from the magazine.

As an incident to the withdrawal of each strip "A" from the magazine, the forward edge of the lowermost strip is pulled down and away from the strips remaining in the stack, thereby causing separation of the edge of the same from the strip next above. This separating device consists of a suction cup 118 carried by a vertical rod 119 sliding in a bearing 120 formed in the frame 28, the said cup 118 in its upward travel passing between the sides of the plates 116 which are cut away to form a clearance opening. The lower end of the rod 119 is slotted at 121 and in the slot is connected the outer or free end of an arm 122 secured to a rock shaft 123 journalled in bearings carried by the intermediate frame 27. Rock shaft 123 also carries an arm 124 on the end of which is rotatably mounted a cam following roller 125 adapted to operate in a cam groove 126 of a face cam 127 mounted on the cam shaft 64.

Continuous rotation of cam 127 with the cam shaft 64 causes oscillation of the rock shaft 123 by reason of the contour of the cam groove 126 operating on the roller 125 carried by the arm 124, and this oscillation of shaft 123 through the arm 122 causes raising and lowering of the rod 119 within its bearing 120. As rod 119 is raised to its uppermost position, the suction head 118 is brought into engagement with the forward end of the lowermost strip "A" positioned in the magazine holder 108. As illustrated in Fig. 4, the interior of the suction head 118 communicates with a vertical bore 128 connecting with the interior of a flexible tube 129 projected from one side of the rod 119 (see also Fig. 7). The end of the tube 129, where it joins the rod 119, moves during its up and down travel within a slot 131 formed in the side of bearing 120, preventing oscillation of the rod on its own axis and insuring proper operation of the arm 122 within the slot 121.

Air is withdrawn at regular intervals from the interior of the cup 118 and connecting passages by means of a self-contained suction or vacuum pump unit embodied in the machine. For connection with said unit (see Fig. 7), the flexible tube 129 connects to a stationary pipe 132 mounted on the intermediate frame 27, the opposite end of the pipe communicating with a cylinder head 133 connected to and closing one end of a cylinder 134 bolted at 135 against the under surface of table 26. A piston 136 operates within the cylinder 134 and is pivotally connected to a wrist pin 137 carried by an arm 138 of an eccentric strap 139 operating over an eccentric 141 secured to the cam shaft 64. A passageway 142 is formed in the cylinder head 133 and communicates with the interior of cylinder 134 adjacent said head and is also connected by means of a lateral bore 143 with the pipe 132.

Constant reciprocation of piston 136 within the cylinder 134 through the communicating passageways, therefore, causes periodic suction impulses at the suction head 118. The piston movement is so timed in connection with the raising and lowering of the suction head that suction applies therein as the same is raised into engagement with the lowermost strip "A." The suction impulses continue during the lowering of rod 119, resulting in a corresponding lowering of the lowermost strip and a separation of the forward end thereof from the remaining strips in the magazine.

Passageway 142 also connects with a passageway 144 forming communication with the outside atmosphere when the end of such passageway is unobstructed. During the applied suction period in head 118, this passageway 144 is closed by means of a valve 145 pivoted at 146 to cylinder head 133. Said valve 145 carries an arm 147 which is pivotally connected to a rod 148 sliding through a boss 149 formed in the outer casing of cylinder 134. The forward end of rod 148 carries a plate 151 which in turn carries a sliding pin 152 also moving within boss 149. This construction permits longitudinal movement of arm 151 but prevents lateral movement thereof and the same is thereby held with its forward end projecting within the path of travel of the rear end of the piston 136. An expansion spring 153 mounted on rod 148 is positioned between one face of the boss 149 and a collar 154 carried by the rod 148 and urges the same toward the left, as viewed in Fig. 7, thereby normally holding valve 145 closed.

As piston 136 moves back and approaches the end of its stroke, it strikes against the bar 151 and slides it and connecting rod 148 toward the right against the action of spring 153. This action moves the valve 145 about its pivot 146 and uncovers passageway 144.

At such a time air enters into passageways 144, 142 and 143 and through pipe 132, tube 129, passageway 128 and suction head 118, thereby breaking the suction action. This release of the lowermost strip "A" from the suction head 118 is to permit withdrawing of the same from the magazine by devices which will now be described.

Feed bars 155 are mounted for sliding movement over the upper surface of frame 28 and between shoulders 156 of the frame and the plates 116 (see Fig. 5). Said bars 155 are connected at their rear extremities to a cross-head 157 operating through suitable slots formed in the frame 28, said cross-head carrying a sliding block element 158 forming a pivotal connection with the upper end of an arm 159. This arm 159 (Figs. 3 and 4) is an integral part of a lever 161 pivoted on a stub shaft 162 mounted in bracket 27. Lever 161 is connected at its lower extremity 163 to a connecting rod 164 secured to a yoke 165 sliding over a block 166 loosely mounted on the cam shaft 64.

Yoke 165 carries a cam following roller 167 which operates within a cam groove 168 formed in a face cam 169 mounted on the cam shaft 64. Oscillation of the yoke 165 through the cam action imparts a to-and-fro movement to said bars 155.

As illustrated in Fig. 5, the forward end of each bar 155 carries a block 171 in which a feed dog 172, held by a spring 173, is pivotally mounted in a pin 174. In the forward position of the bars 155, the inner end of each dog 172 rests forward of the end of the lowermost strip "A" as the latter, separated from the stack, is being held down by the suction head 118 against the plates 115 and 117. While strip "A" is in this held position, the bars 155 move backward and carry their respective feed dogs 172 along the opposite edges of the forward end of the held strip, the springs 173 permitting such sliding action. The suction within the head 118 is then relieved and as the dogs 172 move forward with the following forward movement of bars 155, the inner ends of the dogs move within their respective retaining blocks 171 and the faces of the same tightly wedge against the opposite edges of the lowermost strip "A" and bodily pull the same from beneath the stack of strips within the magazine.

As this removal of the lowermost strip takes place, the rollers 109 mounted in the magazine permit a freer withdrawal of the same. The lowermost strip "A" is thus pulled from its position within the stack and is moved into engagement with the bite of forming rollers which will now be described.

*Forming rollers*

Reference should be had to Figs. 1, 4, 5 and 6, wherein is illustrated the supporting mechanism for the forming rollers which comprises spaced side plates 175 mounted on a forward extension 176 of the bracket 27. A center spacing block 177 is held in place between said plates 175 by bolts 178 and the forward end of plate 117 is secured to the upper surface of the block. A lower forming roller 179 is secured to a shaft 181 journalled in the side plates 175, this roller being positioned within a pocket 182 formed in the block 177, the upper surface of the roller extending slightly above the upper surface of block 177. Two spaced flanging shoulders 183 are formed on opposite ends of the roller 179, the center portion and the shoulders of the same cooperating with a properly shaped upper forming roller to flange the edges of the strip "A" as the same pass through the forming mechanism.

A floating cap member 184 is mounted above the upper surface of each side plate 175, each cap member holding a pair of downwardly extending bolts 185 which pass through the plate 175 and are joined at their lower extremities by a bar 186 (Figs. 4 and 6). The bolts 185 have sliding movement within the plates 175 and an expansion spring 187 is interposed between each bar 186 and its associated plate 175 and normally holds the former in lowered position. An upper forming roller 188 is secured to a shaft 189 journalled in the floating cap members and said roller is normally held in engagement with the forming roller 179 when the cap members are held downwardly as aforesaid. By means of the described floating character of the cap members 184, the upper roller 188 is free to be lifted for a distance equal to the thickness of the strip when the lowermost strip "A" is moved over the plate and into the bite of the forming rollers.

Both forming rollers 179 and 188 are rotated at a high rate of travel and at the same peripheral speed by a train of gears (illustrated in Fig. 6). A gear 191 secured to one end of shaft 189 is at all times in mesh with a gear 192 secured to one end of shaft 181, the depth of the teeth of these gears insuring interengagement notwithstanding the frequent lifting of shaft 189. Gear 192 also meshes with a gear 193 formed integrally with a sprocket 194 rotatably mounted on a fixed stud 195 secured to one of the side plates 175. Gear 193 is constantly rotated by a link chain 196 operating over the sprocket 194 and extending over a sprocket 197 secured to a motor shaft 198 of a high speed electric motor 199 mounted on a bracket 201 extending from one side of table 26 (see Figs. 1 and 2).

As the forward end of the lowermost strip "A" passes between the constantly rotating rollers 179 and 188, it strikes against a deflecting plate 202 secured by means of screws 203 against the upper surface of block 177

(Figs. 4 and 5). The forward edge of said plate 202 is beveled, as indicated at 204, and serves to direct the strip "A" upwardly in a curved path of travel and about a forming mandrel which will next be described. During this action, the forming rollers act in a feeding and forming and also in a flanging and withdrawing capacity. This is done by first moving the strip over the curved surface of the deflecting plate and about the mandrel, thereby imparting to it an annular shape. Second, the action of bending or flanging takes place, whereby the side edges of the strip are bent by reason of the contour of the rollers and their cooperating faces, this producing the cross section illustrated in Fig. 16. The third action is the complete withdrawing of the strip from the magazine, the springs 173 of the dogs 172 permitting sliding of the strip.

*Horizontal forming mandrel with associated wings and guides*

The forming mandrel comprises a hollow shell 205 supported at its rear end by a bracket 206 resting upon and bolted at 207 to bracket 29, the forward part of the shell being supported by and resting upon a plate 208 to which it is attached by a tongue and groove connection 209 (Fig. 7). The plate 208 is secured by a bolt 211 to the web of arch frame 25 (Fig. 8). The rear portion of the shell intermediate the end of plate 208 and bracket 206 is free around its entire surface and it is at this location where the forming mechanism just described is positioned, and it is over shell 205 adjacent this location that the strip is formed into the incompleted annular band "B".

A curved retaining plate and block construction is used at the annular band forming station and acts as a guide for the strip "A" in its movement to position over the mandrel. As illustrated in Figs. 1, 4 and 8, the curved retaining plate is pivoted at 213 on a supporting rod 214 secured at its rear end to bracket 206 and at its front end to a block 215 carried by the frame 25. Retaining block 114 previously mentioned is also pivoted at 213 to rod 214 and is formed with an interior circular face 216 adjacent the mandrel. Block 114 and plate 212 are normally spaced a slight distance from the outer surface of shell 205 and collectively form a continuous circular pass 217 for the strip "A" as it first comes into position on the shell or mandrel. A spring-pressed shoe 218 is mounted for movement within a slot 219 formed in the plate 212 and is secured to a rod 221 sliding within a projection 222 carried by said plate. A spring 223 is interposed between the shoe and the projection and forces the shoe toward the surface of the mandrel, thus providing a frictional drag on strip "A" and insuring proper travel as it moves into position upon the shell 205.

Block 114 and plate 212 are normally held in their spaced positions from the outer surface of the shell 205 by means of latches 224 pivoted on pins carried by the bracket 206. The latch of plate 212 is the same in construction as the latch of block 114 and the latter, shown in detail in Figs. 4 and 8, will now be described.

Latch 224 is formed as a hook for engagement over a pin 225 carried by the block 114 and a spring 226 supported by a projection 227 presses against the latch and holds it in engagement with pin 225 when the block 114 is in normal position. In like manner, plate 212 is normally held locked by its latch 224. To gain access to the band "B" or the mandrel at this position for inspection or removal of the band, either latch 224 is disengaged from its pin 225, whereupon the block 114 or the plate 212 is swung about the rod 214 and lifted to open position.

A cage-like construction of side wings and guide bars is used to insure proper movement of band "B" along the mandrel. This is illustrated in Figs. 3, 7 and 8 and comprises a number of pairs of wings 228 and 229 pivoted at their upper ends adjacent each other and on the supporting rod 214. Guide bars 231 are extended between and carried by the wings 228 and similar bars 232 are extended between and carried by wings 229. When wings 228 and 229 are in normal position, the bars 231 and 232 are held spaced a slight distance from the surface of the shell 205 and in such position form a pass along the mandrel permitting movement of the bands "B" longitudinally thereof.

Figure 10:
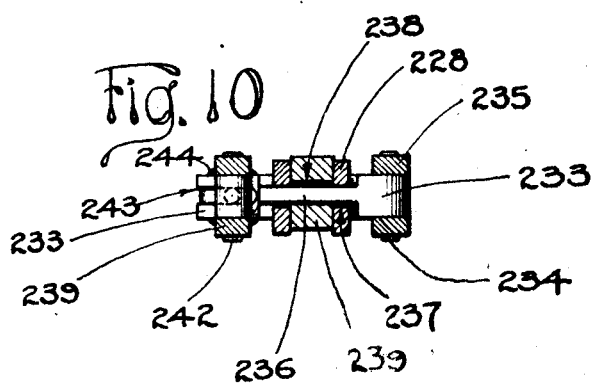
Fig. 10 is an enlarged fragmentary detail taken substantially along line 10—10 of Fig. 8.

As illustrated in Figs. 8 and 10, a latch member is provided for holding the wings 228 and 229 and their associated guide bars 231 and 232 in normal position, this comprising a locking bar 233 pivoted at 234 to a collar 235 secured to rod 214. Said bar 233 is formed with a locking fin 236 which, when in latched position, rests within slots 237 and 238 formed respectively in the upper surfaces of wings 228 and 229. A hand clamp is provided for holding bar 233 in locked position, this comprising a collar 239 secured to rod 214 and spaced from collar 235 by the center pair of wings 228 and 229. A clamp rod 241 is pivoted on a pin 242 carried by collar 239 and swings to locking position within a slot 243 formed in the free end of the locking bar 233. The locking bar 233 cannot be lifted to disengage its locking fin 236 from the slots in the side wings 228 and 229 when the rod 241 is held within the slot 243. A clamping hand nut 244, screwed on the rod 241 and clamping against the locking bar 233, forms the locking attachment. When it is desirable to inspect a band "B" or remove it from the mandrel, the hand nut is unscrewed from its locking position sufficiently to permit swinging of the rod 241 about the pin 242 which action removes it from the slot 243. Locking bar 233 is thereupon free to be swung upward on its pivot 234 and locking fin 236 is thus removed from the slots 237 and 238. Wings 228 and 229 and their associated guide bars 231 and 232 can then be lifted by pivoting the wings about the supporting rod 214.

Reciprocating feed bars

Grooves 245 are formed in the wall of the supporting mandrel or shell 205 (Figs. 7 and 8) and in these grooves slide feed bars 246, there being illustrated a single feed bar at the top and two bars at the sides and near the bottom part of the shell. The bars 246 are connected together by means of a spider 247 which carries an extension yoke 248. The feed bars are reciprocated in a manner now to be described, and during this movement the yoke 248 operates in a slot 249 formed in the bottom part of shell 205, the slot being also cut through the rear end of the supporting plate 208. At the same time the spider 247 moves within slots 250 cut through the wall of shell 205. Yoke 248 is pivotally connected at 251 to a link 252, in turn pivoted at 253 to the upper part of an arm 254 which oscillates about a fixed shaft 255 held in bearings 256 formed in the table 26. Arm 254, intermediate its length, is pivoted at 257 to an arm 258 of a pitman 259 operated by a crank 261 formed in the auxiliary cam shaft 92 (see Figs. 8, 9 and 11). Continual rotation of the auxiliary shaft 92 through the described connections imparts reciprocation to spider 247, thus moving the feed bars 246 forward and backward in their guideways.

The feed bars 246 move on the inside of the circular bands "B" supported by shell 205 and spring-pressed pivoted feed dogs 262 carried thereby in slots 263 formed therein provide means for advancing said bands "B" in a forward direction along the axis of the supporting mandrel. During this advance of band "B" (Fig. 7), the ends of the same are spread apart (owing to the relatively large diameter of the shell 205) and pass along either side of the plate 208. Relatively stationary spring-pressed dogs 264 are pivoted in slots 265 formed in certain of the guide bars 231 and 232 and these normally project into engagement with the rear edges of the bands "B" and prevent their backward movement when the feed bars 246 are returning on their backward or idle stroke.

Clamping and riveting band

An auxiliary mandrel or horn is attached to the forward end of the supporting mandrel and constitutes the holding elements for the band "B" at the clamping and riveting station. It is at this station where the edges of the band are brought together, overlapped and permanently joined. As illustrated in Figs. 8, 12 and 14, said auxiliary horn, indicated generally by the numeral 266, comprises a central stationary block 267 and an end plate 268, both secured to shell 205 by screws 269.

Two contracting and expanding side plates 271 are movably mounted on opposite sides of the block 267 and are thus positioned between plate 268 and the end of shell 205. When said side plates 271 are held in expanded position by means hereinafter fully described, the outer periphery of the same, taken in conjunction with the outer periphery of the top and bottom faces of block 267, constitutes the complete circular horn 266, whose diameter, smaller than the diameter of shell 205, is the same as the inner diameter of band "B" after the ends thereof have been brought together and overlapped in a manner which will now be described.

As band "B" is brought into position upon the auxiliary horn 266 by means of feed bars 246 as previously described, the upper central part of the same is engaged by a clamping mechanism, comprising a vertically sliding clamping bar 272 operating in guide-ways formed in a bracket 273 screwed to the web of the frame 25.

The lower face of the bar 272 is slightly curved to exactly fit and tightly engage the outer surface of the band "B" holding it against the upper peripheral surface of block 267 of the auxiliary horn 266. The upper extremity of bar 272 is slotted and thereby loosely connected with an extended boss 274 formed on one end of a lever 275 pivoted about a fixed stud 276 secured to the frame 25. The opposite extremity of the lever 275 is pivotally connected at 277 with an adjustable connecting rod 278 pivotally connected at 279 to a bell crank lever 281 pivoted about a fixed stud 282 carried by the web of frame 25. One arm of bell crank lever 281 carries a cam following roller 283 engaging the peripheral cam surface 284 of a composite cam 285 carried by cam shaft 64. An arm 286 extended from the bell crank lever 281 is yieldingly connected through a coil spring 287 with a post 288 extended from the frame 25, and this insures engagement at all times between the cam roller 283 and cam 285.

With band "B" thus clamped at the top, side wings operate to wrap the same about the horn 266 and to overlap the ends thereof, one of the side wings operating slightly in advance of the other for this purpose. The side wings, designated by the numerals 289 and 291, are pivoted respectively at 292 and 293 upon the bracket 273 (Fig. 12). Each wing 289 and 291 is pivoted at 294 to a block 295 in which is secured a rod 296 passing at its upper end through the boss of a block 297 and having slight sliding movement therein. A coil spring 298 surrounds each rod 296 and is interposed between blocks 295 and 297 and forms a yielding connection between each wing and its associated boss 297, the upper end of rod 296 above the boss of block 297 carrying a collar 299 for a purpose hereinafter set forth.

The blocks 297 are pivotally connected at 301 to a rocking lever 302 pivoted about a fixed stud 303 carried by the frame 25. The free end of lever 302 is pivotally connected at 304 to an adjustable connecting rod 305 pivotally secured at its lower extremity 306 to a lever 307 in turn pivoted about a stud 308 carried by the frame 25. Lever 307 carries intermediate its length a cam following roller 309 operating within a cam groove 311 formed in the inner face of a double cam 312 keyed to one extremity of the cam shaft 64 (Fig. 8).

Through the described connections, it is evident that wings 289 and 291 are moved about their pivots 292 and 293 and when brought to fully lowered position clamp the sides of the band "B" about the properly sized auxiliary horn 266.

Rod 296 for wing 289 is slightly longer than the corresponding rod for wing 291, and as lever 302 is being lowered wing 289 first engages one end of band "B" and clamps it against the horn 266 before wing 291 comes into engagement with the other end of the band. That end of the band first engaged will therefore be inside and the other end will move over and rest in lapped position on the outside as wing 291 reaches the end of its movement. Springs 298 permit sliding of rods 296 relative to blocks 297 after a wing 289 or 291 has been stopped in clamping position, and a certain lost motion is therefore possible for the lever 302 as it continues to make its full stroke. In returning wings 289 and 291 to unclamping position as lever 302 is lifted, the springs 298 first close the gap between their associated blocks 297 and collars 299, after which the wings are lifted by a pulling action on rods 296 acting against the collars 299.

After band "B" has been clamped at its top and sides and after its ends have been properly overlapped, the latter are further clamped prior to and during piercing of the same and during clinching of the pierced parts in the riveting operation. This latter holding device, illustrated in Figs. 8 and 12, comprises a sliding clamp block 313 moving vertically within guide-ways 314 formed in a stationary housing 315 bolted to the web of frame 25, a cover plate 316 being held thereon by screws 317 and preventing displacement of the block 313. The upper end of clamp block 313 carries spaced projections 318 which engage the outside surfaces of the overlapped ends of the band. Slots 319 (Fig. 9) are cut in the outer side walls of the block 313 and slide plates 321 are positioned therein, these being pivoted at 322 to the forward ends of arms 323 of a bifurcated lever 324 oscillating about a fixed shaft 325 held in bearings 326 formed in frame 25, this constituting part of the mechanism for raising and lowering block 313 in proper time. During oscillation of the lever 324, the arms 323 thereof move freely within openings 327 formed in the housing 315 and in the frame 25.

Figure 9:
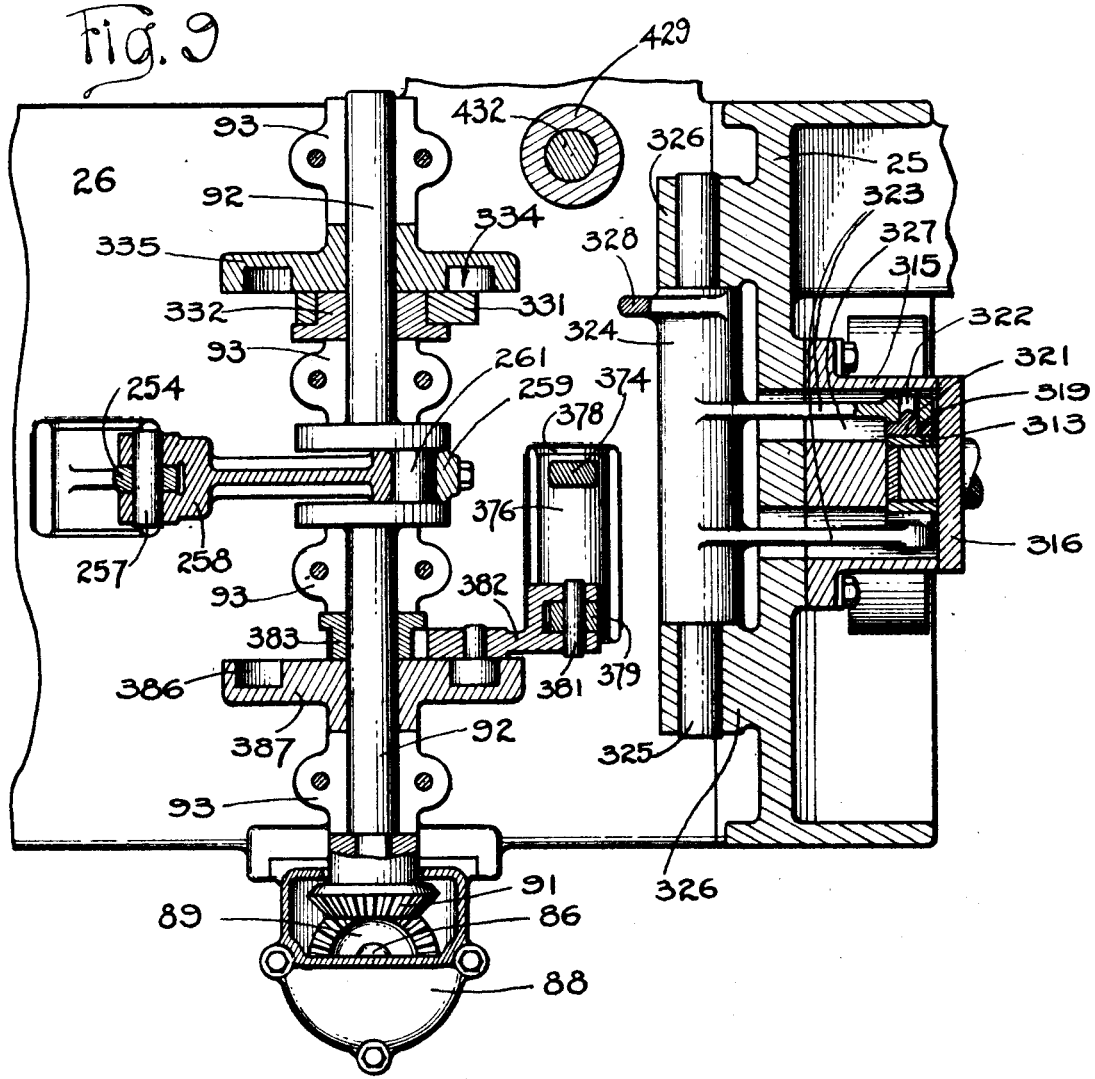
Fig. 9 is an enlarged sectional plan view taken substantially along line 9—9 of Fig. 8.

Rocking motion is imparted to lever 324 by connection to an arm 328 carried thereby, the arm being pivoted at 329 to a cam yoke 331 sliding over a block 332 carried by the auxiliary cam shaft 92 (see Figs. 8, 9 and 11). Yoke 331 carries a cam following roller 333 which operates within a groove 334 of a cam 335 secured to shaft 92.

While the band "B" is tightly held on horn 266 with its two ends properly lapped, it is pierced as a first step in the riveting operation. The piercing mechanism comprises a piercing rod 336 moving through a passageway 337 cut centrally of block 313 and carried by a punch slide 338 operating inside of housing 315 and within a channel 339 formed centrally of the lower portion of block 313 (Figs. 8 and 12). An anvil 341 is inserted within the lower part of block 267 of auxiliary horn 266 and is held in position by screws 342. A vertical channel 343 (slightly larger in diameter than passageway 337) is formed in the anvil and is in axial alignment with the piercing rod 336. As the rod 336 is raised by the lifting of slide 338, it is forced completely through the overlapped ends of band "B," the upper end of the piercing rod entering into the passageway 343 and forcing a part of the displaced metal before it into said opening. The mechanism used for lifting the slide 338 will now be described.

The lower end of slide 338 carries an extended boss 344 in which is threadedly secured an adjustable connecting rod 345 connected to the upper end of a cam yoke 346 sliding about a block 347 carried by the cam shaft 64. Yoke 346 moves between cams 285 and 312 and carries a cam following roller 348 which operates within a cam groove 349 formed in one face of the composite cam 285.

The final riveting operation comprises a clinching of the projecting metal surrounding the pierced hole to produce the rivet joint illustrated in Fig. 17. With the band "B" still firmly clamped on horn 266 and the projecting metal thereof which surrounds the pierced hole resting inside the passageway 343 of anvil 341, a clinching pin 351 sliding within the passageway (Fig. 8) is moved downward against said projecting metal crowding the same back on itself and against the inner wall of the band. The clinching pin 351 is carried on the upper end of a sliding plate 352 interposed between the forward face of housing 315 and the rear face of slide 338, the upper end moving between the forward end of shell 205 and the anvil 341.

The lower end of plate 352 is connected to a block 353 movable in a passageway 354 formed in the housing 315 and a connecting rod 355 is secured at its lower end to a cam yoke 356 sliding over a block 357 mounted on the cam shaft 64. Yoke 356 is positioned between the front face of arch frame 25 and the rear face of the composite cam 285 and carries a cam following roller 358 which operates within a cam groove 359 of the cam.

By the action of riveting the ends of band "B" together, as just described, there is formed a band which will be designated by the letter "C" and this is first unclamped by reversed movement of the described clamping mechanisms and then removed from the horn 266 at the next forward stroke of the feed bars 246. However, before said band "C" can be slid laterally from the horn 266, it is necessary to collapse the horn or in effect reduce its diameter. This is necessary by reason of the close fit of band "C" on the horn and also by reason of the flanged edges of the same which rest at such time within the grooves 361 formed in the surface of the horn (Fig. 14). This collapsing mechanism will now be described.

As illustrated in Fig. 8, the side plates 271 interlock with block 267 in a tongue and groove connection 362 which insures proper alignment of the parts during expansion and contraction. A strap 363 (Figs. 12 and 14) is secured by screws 364 to the central inner face of each plate 271 and a bolt 365 is positioned within an opening 366 formed in each plate 271 and passes through the strap 363 having a loose fit therein. Each bolt is secured at its inner end to the central block 267, the head of the same confining a coil spring 367 between it and strap 363. This construction of parts under the spring action tends to force each side plate 271 inwardly toward collapsed position.

Provision is made, however, for preventing this collapse of horn 266 during the riveting opration just described, this consisting of parts shown in detail in Figs. 8 and 14. Wedge blocks 368, secured by screws 369, project inwardly from each side plate 271 and have sliding movement within slide-ways 371 formed in the block 267. The inner extremity of each block 368 is engaged by a rod 372 sliding within an opening formed along the longitudinal axes of horn 266 and the forward end of shell 205.

Depressions 373 formed in the rod 372 permit inward movement of the wedge blocks 368 and the collapse of horn 266 when rod 372 is in one position. When the depressions are out of register with the extremities of the blocks 368, the latter are held outwardly by the smooth surface of rod 372 and the horn 266 is thereby expanded.

The mechanism for sliding the rod 372 into wedging or unwedged position comprises a lever 374 slotted at 375 for loose engagement with the rod 372, said lever being formed integrally with a sleeve 376 (Figs. 8, 9 and 11) loosely carried by a stationary shaft 377 held in bearings 378 formed on the under side of the table 26. An arm 379 is also formed integrally with the sleeve 376 and is pivotally connected at 381 with a cam yoke 382 sliding over a block 383 mounted on the auxiliary cam shaft 92. Yoke 382 carries a cam following roller 385 which operates within a cam groove 386 of a face cam 387 carried by shaft 92.

Cam operation of lever 374 therefore positions rod 372 in proper relation with the described parts of horn 266 to permit the springs 367 thereof to collapse the same and to thereby free band "C" resting upon the horn at the riveting station. Following the freeing of the band "C", the feed mechanism previously described slides the same off the horn and positions it in a transfer mechanism next to be described.

*Collar band feed turret*

The transferring mechanism into which the riveted band "C" is received for conveyance to the curling station and from thence to the discharge station consists of certain movable parts including the collar feed turret, hereinafter fully described, and certain stationary members forming a housing for the movable parts and guides for the band. The latter or stationary members can best be observed perhaps in Figs. 1, 3, 8 and 12, which disclose a bracket 388 secured at its lower end to a support pad 389 projected from the forward face of the web of frame 25 and extending upward to and formed integrally with housing 391 and a boss 392 encircling the forward extremity of turret shaft 74.

A circular drum comprising a peripheral wall 393 and spaced inner and outer side walls 394 and 395 is centered about turret shaft 74 and is held in a stationary position by bolts 396 connecting inner wall 394 with plate 76 and by bolts 397 connecting outer wall 395 with bracket 388.

The circular drum constitutes a housing for the turret and a guideway for band "C" conveyed thereby. Inner wall 394 is cut away at its center for proper clearance of turret shaft 74, also opposite the end of horn 205 for clearance of the band "C" as it is introduced into the drum, and also at the curling station for clearance of the curling head. Outer wall 395, in a similar manner, is cut away at its center for proper clearance of housing 391 and boss 392 and also at the curling station for clearance of certain parts of the curling mechanism. Peripheral wall 393, near its bottom and to one side, is cut away at 398 (Fig. 12) to form a discharge opening which communicates with a discharge chute 399 having an inclined floor 401 and secured by bolts 402 (Fig. 8) to inner wall 394.

As band "C" is removed from horn 266 and introduced into the circular drum through the clearance opening formed in the inner wall 394, it is positioned into one of a series of pockets 403 of a turret 404 secured to a collar 405 keyed to shaft 74, said turret having step by step rotation within a channel 406 formed interiorly of said circular drum and bounded by the walls 393, 394 and 395 (Figs. 8 and 12).

This transfer takes place during the rest period of turret 404, and to insure an exact alignment of pocket 403 with horn 266 as band "C" enters the same, there is provided a pilot device comprising a sliding pilot pin 407 which is raised during the rest period to engage one of a series of holes 408 formed in the peripheral surface of collar 405, there being a hole 408 for each pocket 403. Pilot pin 407 is formed on the upper end of a square bar 409 sliding within a square channel 411 extending vertically through the lower portion of bracket 388. A transverse slot 412 cut in the lower end of the bar 409 makes a loose connection with a sliding block 413 pivoted at 414 to an arm 415 rocking about stud 308.

The opposite end 416 of said arm 415 carries a cam following roller 417 operating within a cam groove 418 formed in the outer face of cam 312. Said cam connections properly time the raising of pilot pin 407 to lock the turret 404 during the active operations relative to band "C" carried thereby and also properly time the lowering of the pin 407 to free the turret 404 to permit movement thereof when it is performing its transfer function. Band "C" is carried along the channel 406 in a clockwise direction (as viewed in Fig. 12) and is brought to rest at and moved through two idle stations during its transfer from its received position to its position of rest at the curling station.

Collar band curling

The curling mechanism is best illustrated in Figs. 1, 12 and 13 and comprises a backing plate 419 mounted on a stub shaft 421, the former extending through one of the clearance openings formed in the wall 395, the inner face of the wall being flush with the inner face of the backing plate. Shaft 421 is loosely mounted in a bearing formed in a bracket 422 connected to and extended from housing 391, a collar 423 being pinned to shaft 421 and thus rotatably holding the same within its bearing. Shaft 421 and backing plate 419 are in axial alignment with the curling head shaft 105, previously referred to, and the band "C" is brought to rest in axial alignment with these parts.

Curling rollers 424 are loosely mounted on fixed, radially disposed pins 425 carried by a curling head 426 which is keyed to the forward end of the shaft 105 and which is continually rotated therewith, the head carrying the curling rollers bodily in a circular path about the axis of the positioned band "C". As band "C" is first brought into position at this station, head 426 is in a rear position, being entirely outside the wall 394, but during the operation of curling the same is moved into the clearance opening cut through the rear wall 394, this inward position being illustrated in Fig. 13. During this inward movement of head 426, band "C" is resting within pocket 403 of the then stationary turret 404 and its forward edge is resting against the then stationary backing plate 419. As soon as the rapidly rotating and forwardly advancing head 426 brings rollers 424 against the forward edge of the band, the friction between the rollers and the band and between the band and the backing plate becomes for the moment greater than the friction of the shaft 421 within its bearing. Band "C" and plate 419 thereupon start rotating with the rotation of head 426, the shaft 421 rotating within its bearing.

As the forward advance of head 426 continues, more pressure is thereby put upon the rear edge of the band "C" and the friction between the same and the backing plate 419 is increased, whereupon the latter is forced more tightly against the bracket 422. Friction between band "C" and plate 419 and between the plate and bracket 422 soon becomes greater than the friction between rollers 424 and the band's edge, and band and plate 419 come to a full stop or slowly creep about the axis of shaft 421 at which time the curling rollers 424 traverse the rear edge of the band and bend or curl the same into the shape disclosed in Fig. 18. The actions just described take place rapidly and the transition between the movements is both smooth and uniform. It will be understood that this initial rotation of band "C" and its subsequent non-rotation during the curling operation permit an easier action of the curling rollers and prevent uneven curling of the band's edge.

The curling head 426 is moved into and out of the opening in the wall 394 by a sliding of shaft 105 within its bearings 106, a slotted sleeve 427 (Figs. 1, 11 and 13) being loosely mounted for this purpose upon the shaft intermediate two pinned washers 428. A yoke 429 carries blocks 431 pivoted thereto and sliding within the slots of sleeve 427, and the yoke is connected to a vertical shaft 432 oscillating in a bearing 433 formed in the table 26. The lower end of shaft 432 carries a lever 434 on the outer extremity of which is pivotally mounted a cam following roller 435 operating in a cam groove 436 formed in the peripheral surface of a barrel cam 437 keyed to the shaft 64 (see also Fig. 8).

Collar band discharge

The finished collar or band "D" is removed from the curling station by the succeeding step rotation of turret 404, curling head 426 being moved backwardly and free of the band at such time. As band "D" is carried about its circular path of travel within chamber 406, it rests by gravity against the inner surface of the peripheral wall 393 until it is brought in register with the discharge opening 398 when it falls between the walls of chute 399 and onto the inclined floor 401 over which it rolls outside of the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A machine for forming metal bands, comprising a magazine for holding strips, a forming mandrel, means for removing individual strips from said magazine and arranging the same upon said mandrel with their ends lapped, and means for punching and riveting the metal of the lapped strip ends together to form cylindrical metal bands.

2. A machine for forming metal bands, comprising a magazine for holding strips, a forming mandrel, means for removing individual strips from said magazine and arranging the same upon said mandrel with their ends lapped, and devices for forming integral metal rivets in the lapped strip ends to permanently join the latter.

3. A machine for forming metal bands, comprising a magazine for holding strips, a forming mandrel, means for removing individual strips from said magazine and arranging the same upon said mandrel, means for overlapping the ends of said strips and clamping the same about said mandrel, and devices for forming integral metal rivets in the overlapped strip ends to permanently join the latter.

4. A machine for forming metal bands, comprising a magazine for holding strips, a forming mandrel, means for removing individual strips from said magazine and arranging the same upon said mandrel, intermittent feeding devices for moving the strip along said mandrel, means for arranging the strip ends in overlapped relationship and forming a band of desired size, and means for operating on and permanently joining said overlapped ends by punching and interlocking the metal thereof.

5. In a machine for forming metal bands, the combination of a forming mandrel, means for arranging a metal strip upon said mandrel with its ends overlapped, devices for punching and riveting the metal of the lapped strip bands, and curling mechanism for bending and curling an edge of said cylindrical metal band.

6. In a machine for forming metal bands, the combination of a forming mandrel, means for arranging a metal strip upon said mandrel with its ends overlapped, devices for punching and riveting the metal of the lapped strip bands, and curling mechanism including curling rollers for bending and curling an edge of said cylindrical metal band.

7. A machine for forming metal bands, comprising a magazine for holding strips, a forming mandrel, means for removing individual strips from said magazine and arranging the same upon said mandrel with their ends lapped, means for punching and riveting the metal of the lapped strip ends together to form cylindrical metal bands, and curling mechanism for bending and curling an edge of said cylindrical metal band.

8. A machine for forming metal bands, comprising a magazine for holding strips, a forming mandrel, means for removing individual strips from said magazine and arranging the same upon said mandrel, said means including a device for separating an edge of one of said strips from the remainder of the strips within the magazine, devices for engaging the separated strip and withdrawing it from said magazine, feeding devices for positioning the withdrawn strip over said mandrel, and cooperating means for curling a longitudinal edge of the strip.

9. A machine for forming metal bands, comprising a magazine for holding strips, a forming mandrel, means for removing individual strips from said magazine and arranging the same upon said mandrel, said means including a suction device for separating an edge of said strips from the remainder of strips within the magazine, reciprocating devices for engaging the separated strip and withdrawing it from said magazine, and rotatable feeding devices for positioning the withdrawn strip over said mandrel and having means for curling an edge of the strip.

10. A machine for forming metal bands, comprising a magazine for holding strips, a forming mandrel, means for removing individual strips from said magazine and arranging the same upon said mandrel, said means including a device for separating an edge of one of said strips from the remainder of the strips within the magazine, devices for engaging the separated strip and withdrawing it from said magazine, feeding devices for positioning the withdrawn strip over said mandrel, means for overlapping the ends of said strip, and mechanism for punching and riveting the metal of the lapped strip ends together to form cylindrical metal bands.

11. A machine for forming metal bands, comprising a magazine for holding strips, a forming mandrel, forming mechanism for bending a strip into annular form and arranging it upon said mandrel, means for overlapping the ends of said strip and clamping the same about said mandrel, devices associated with said mandrel for punching and riveting the metal of the lapped strip ends together to form cylindrical metal bands, curling mechanism for bending and curling an edge of said cylindrical metal band, and associated feeding devices for transferring the strip from said magazine to said forming mechanism and transferring said formed strip along said mandrel to said punching and riveting devices and for transferring said cylindrical band from said mandrel to said curling mechanism, all in proper timed coordination with said forming, clamping, punching, riveting and curling operaitons.

12. A machine for forming metal bands having a securing station and a curling station, comprising a forming mandrel, means for arranging a strip upon said mandrel, primary feeding devices for transferring said formed strip along said mandrel to the securing station, devices operating at said station to overlap and secure together the ends of said formed strip to produce an annular metal band, secondary feeding devices for transferring said metal band from said mandrel and from said station to the curling station, and curling mechanism operating at said latter station for curling an edge of said annular metal band.

13. A machine for forming metal bands having a securing station and a curling station, comprising a forming mandrel, means for arranging a strip upon said mandrel, primary feeding devices for transferring said formed strip along said mandrel to the sesuring station, devices operating at said station to overlap and secure together the ends of said formed strip to produce an annular metal band, secondary feeding devices, including a turret, for transferring said metal band from said mandrel and from said station to the curling station, and curling mechanism operating at said latter station for curling an edge of said annular metal band.

14. A machine for forming metal bands having a securing station and a curling station, comprising a forming mandrel, means for arranging a strip upon said mandrel, primary feeding devices for transferring said formed strip along the axis of said mandrel to the securing station, devices operating at said station to overlap and secure together the ends of said formed strip to produce an annular metal band, secondary feeding devices operating at right angles to the axis of said forming mandrel for transferring said metal band from said mandrel and from said station to the curling station, and curling mechanism operating at said latter station for curling an edge of said annular metal band.

15. In a machine for forming metal bands, the combination of a forming mandrel, a pocketed turret, means for transferring an annular metal band from said forming mandrel into a pocket of said turret, means for advancing said turret and said metal band carried thereby to a station, and curling mechanism at said station for bending and curling an edge of said metal band while the same is in its turret pocket.

16. A machine for forming metal bands, comprising a magazine for holding rectangular strips, a forming mandrel, and means including wedging devices for engaging opposite edges of a narrow end of a strip and withdrawing the strip from the magazine by a pulling action on the narrow edge and arranging the same upon said mandrel.

17. A machine for forming metal bands, comprising a forming mandrel, means for arranging strips in annular form upon said mandrel, primary feeding devices for transferring said strips along the longitudinal axis of the mandrel, secondary feeding devices including a turret mounted on an axis parallel to the axis of the mandrel for further transferring the formed strip at right angles to its former path of travel.

18. A machine for forming metal bands, comprising a forming mandrel, means for arranging strips in annular form upon said mandrel, primary feeding devices for transferring said strip along the longitudinal axis of the mandrel, and secondary feeding devices including a turret having pockets and mounted on an axis parallel to the axis of the mandrel for further transferring the formed strip at right angles to its former path of travel, a positioned pocket of said turret directly receiving the formed strip from said mandrel.

JOHN F. PETERS.